United States Patent [19]

Moore, III et al.

[11] 4,282,572
[45] Aug. 4, 1981

[54] MULTIPROCESSOR MEMORY ACCESS SYSTEM

[75] Inventors: Harry W. Moore, III, Watkins Glen, N.Y.; Steven M. Quack, Warsaw, Ohio

[73] Assignee: NCR Corporation, Dayton, Ohio

[21] Appl. No.: 3,692

[22] Filed: Jan. 15, 1979

[51] Int. Cl.³ .............................................. G06F 15/16
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 3,636,331 | 1/1972 | Amrehn | 364/200 |
| 3,665,487 | 5/1972 | Campbell | 364/200 |
| 3,866,182 | 2/1975 | Yamada | 364/200 |
| 3,889,237 | 6/1975 | Alferness | 364/200 |
| 3,950,729 | 4/1976 | Fletcher | 364/200 |
| 4,020,466 | 4/1977 | Cordi | 364/200 |
| 4,034,347 | 7/1977 | Probert, Jr. | 364/200 |
| 4,040,023 | 8/1977 | Curtis | 364/900 |
| 4,084,231 | 4/1978 | Carozzi | 364/200 |

*Primary Examiner*—Gareth D. Shaw
*Assistant Examiner*—David Y. Eng

*Attorney, Agent, or Firm*—J. T. Cavender; Wilbert Hawk, Jr.; Richard W. Lavin

[57] ABSTRACT

A data processing system is disclosed in which a high-speed processor is added to a slow-speed processor and in which both processors have access to a first memory unit with the slow processor having access priority over the fast processor. In order to allow the fast processor to operate without losing data when a conflict occurs during a write operation, a second memory is coupled to the fast processor in which is stored all the data stored in the first memory. When the fast processor attempts to write into both memories but fails to write into the first memory due to a conflict with the slow processor, the data stored in the second memory is then transferred to the first memory subsequent to the completion of the access operation by the slow processor. This arrangement allows the fast processor to complete the write operation interrupted by the conflicts with the slow processor, thereby allowing the fast processor and the slow processor to have access to the same data. Both memories are continuously balanced by the fast processor so that each memory will contain the same data allowing both processors access to the same data.

8 Claims, 5 Drawing Figures

MULTIPROCESSOR MEMORY ACCESS SYSTEM

BACKGROUND OF THE INVENTION

The present invention relates to data processing systems, and more specifically, to a system in which a single processor system is converted into a distributed processor system.

Present-day data terminal devices have been developed using low-cost microprocessors such as the Intel 8080A microprocessor for supplying the processing power required for the terminal system. After installation and operation, it has been found that in many instances the terminal processing system is being all but totally overloaded requiring limiting the operation of the terminal or redesigning the processing system to include a more powerful processor, which in the latter case is quite costly. If the processing system is constructed on a request acknowledge basis, it is relatively easy to make the system memory a two port memory and add a second processor to assume part of the load. Where the system is not based on a true memory request acknowledge system, adding a second processor requires considerable redesign of the system to allow for the interfacing of the two processors without restricting the operation of either of the processors. It is therefore the principal object of this invention to provide a data processing system in which a processor is added to an established data processing system using a minimum amount of circuit hardware. It is another object of this invention to provide a system in which a fast processor is interfaced with a slow processor and in which each processor will have access to the same data. It is a further object of this invention to provide a data processing system in which a slow processor is given priority over a fast processor in accessing a common memory without allowing any data to be lost or modified when a conflict arises between the two processors in accessing the common memory.

SUMMARY OF THE INVENTION

In order to carry out these objects, there is disclosed a data processing system which includes a slow processor coupled to and having priority of access to a first memory unit in which the slow processor performs read and write operations. The system also includes a fast processor coupled to the first memory unit and to a second memory unit. The fast processor normally performs a simultaneous write operation in both the first and second memory units, but a read operation only in the second memory unit. If a conflict arises between the processors when the fast processor is attempting to write into the first memory unit, the data attempted to be written into the first memory unit is stored in the second memory unit. Subsequent to the completion of the slow processor's access operation, the fast processor will complete its interrupted write operation using the data stored in the second memory. The fast processor will then transfer into the second memory unit all of the data written into the first memory unit by the slow processor, thereby providing both memory units with the same data, allowing both processors to access the same data.

BRIEF DESCRIPTION OF THE DRAWING

The invention may be best understood, however, by referring now to the following description, taken in conjunction with the accompanying drawings, in which like reference numerals identify like elements in the several figures and in which.

DESCRIPTION OF THE PREFERRED EMBODIMENT

Figure 1:
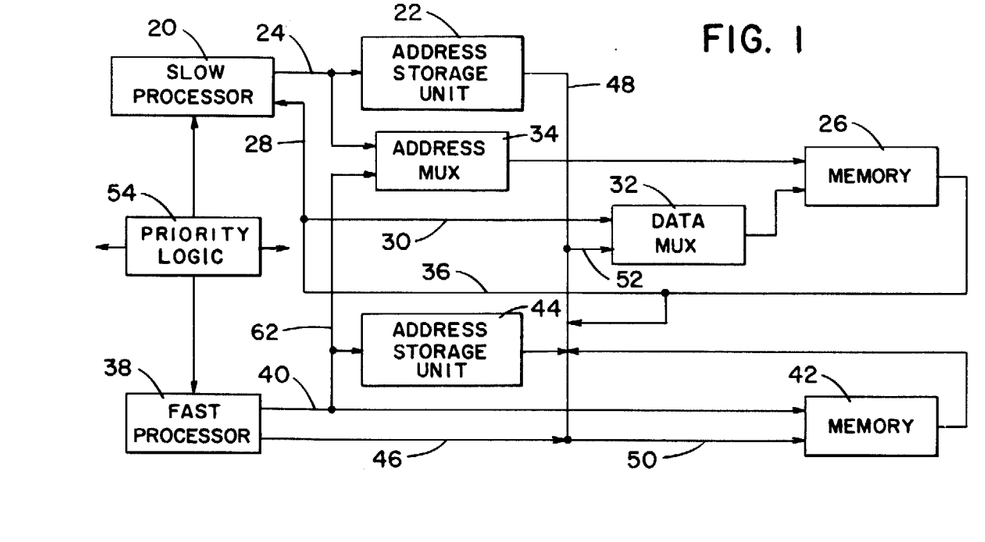
FIG. 1 is a general block diagram of the multiprocessor memory access system incorporated in the present invention.
Figure 2:
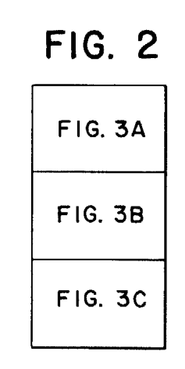
FIG. 2 is a diagram of the arrangement of FIGS. 3A, 3B and 3C.

Referring now to FIG. 1, there is shown a general block diagram of the multiprocessor memory access system contemplated by the present invention in which is included a slow data processor 20, such as the Intel 8080A microprocessor manufactured by the Intel Corporation, Santa Clara, Calif. The processor 20 is coupled to an address storage unit 22 over the bus 24 in which unit 22 is stored the addresses of each data block written into a first memory unit 26 over data buses 28 and 30 coupled between the processor 20 and the memory unit 26 through a data multiplexer 32. The address of the written data is transmitted through an address multiplexer 34 to the memory unit 26. Data read from the memory unit 26 is transmitted over buses 36 and 28 to the processor 20. In the present system, the slow processor 20 accesses only the memory unit 26. The system also includes a fast processor 38, such as the Signetics 8×300 manufactured by the Signetics Corporation of Sunnyvale, California. The processor 38 has an address bus 40 coupled to a second memory unit 42, an address storage unit 44 and the memory unit 26 through the address multiplexer 34. The fast processor 38 accesses both memory units 26 and 42 simultaneously. Data transmitted over buses 46–52 inclusive allows the fast processor 38 to write data in both memory units 26 and 42 at an address stored in the address storage unit 44. If during a write operation by the fast processor 38 into the memory units 26 and 42, the slow processor 20 requires access to the memory unit 26 to write data into such memory unit, priority logic 54 interrupts the accessing of the memory unit 26 by the fast processor 38, allowing the slow processor 20 to access the memory unit 26. At this time, the fast processor 38 completes its access of memory unit 42 storing the address of the written data in the address storage unit 44.

At the completion of the access operation of the slow processor 20, the processor 38 will store the data written into memory unit 42 thereby into the memory unit 26 using the data stored in memory unit 42 and the address stored in the address storage unit 44. The processor 38 will also store the data written into memory unit 26 by the processor 20 into the memory unit 42 using the address stored in the address storage unit 22. Thus, both memory units 26 and 42 will always be continually balanced thereby containing the same data allowing both processors 20 and 38 to operate at their own speed without the danger of losing data during a conflict operation.

Figure 3A:
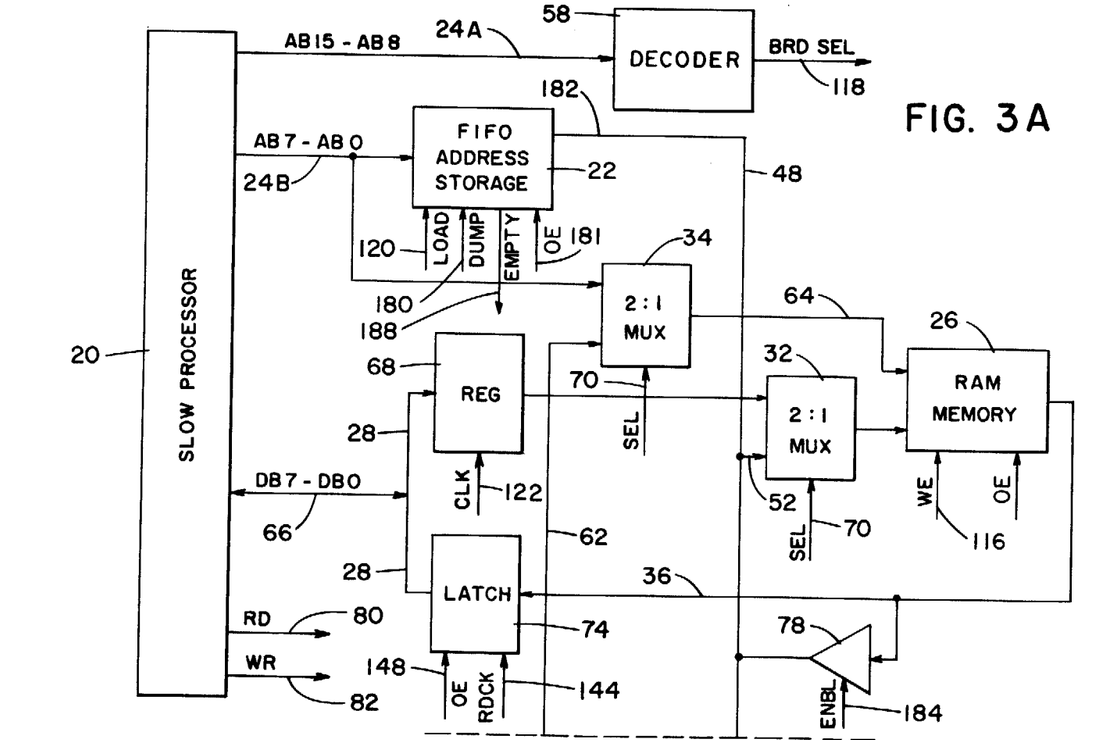
FIGS. 3A, 3B and 3C taken together as shown in FIG. 2 define a circuit diagram of the present multiprocessor memory access system.
Figure 3B:
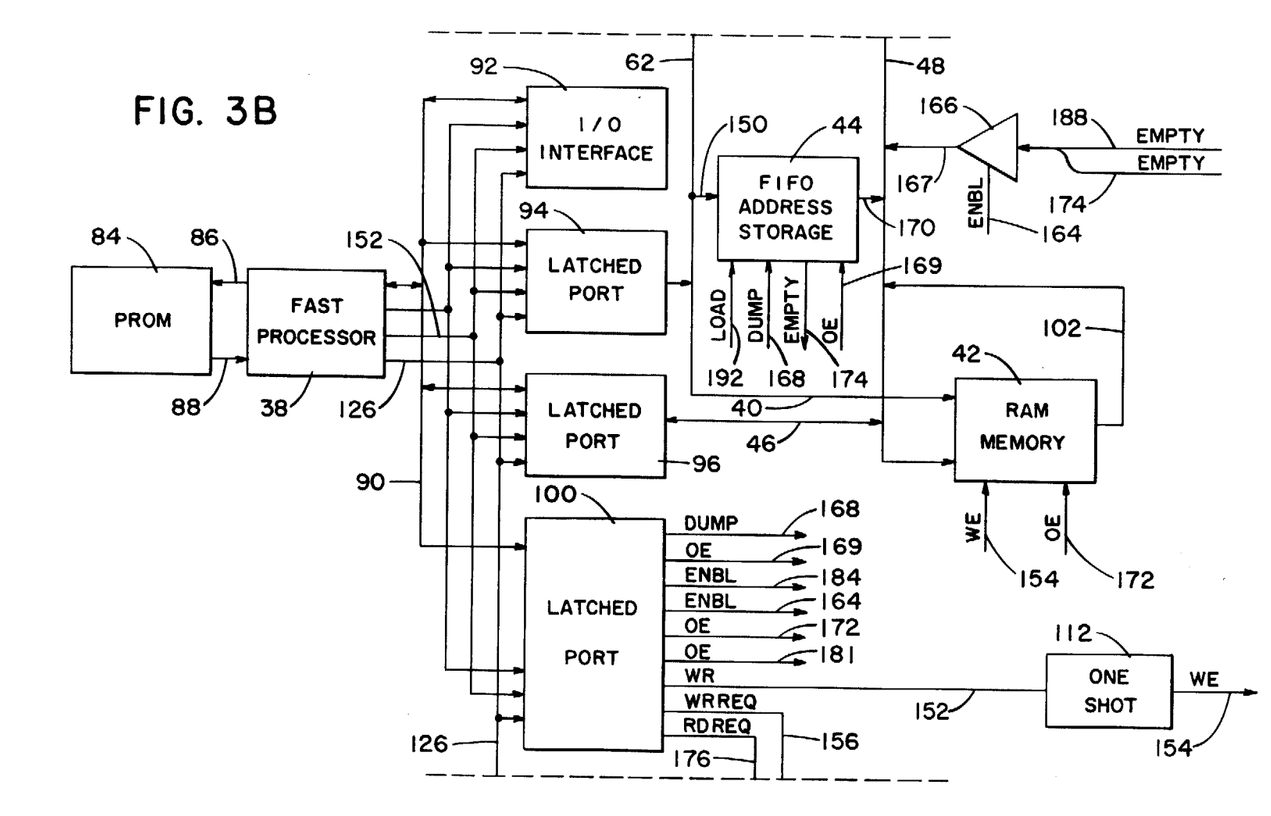
Figure 3C:
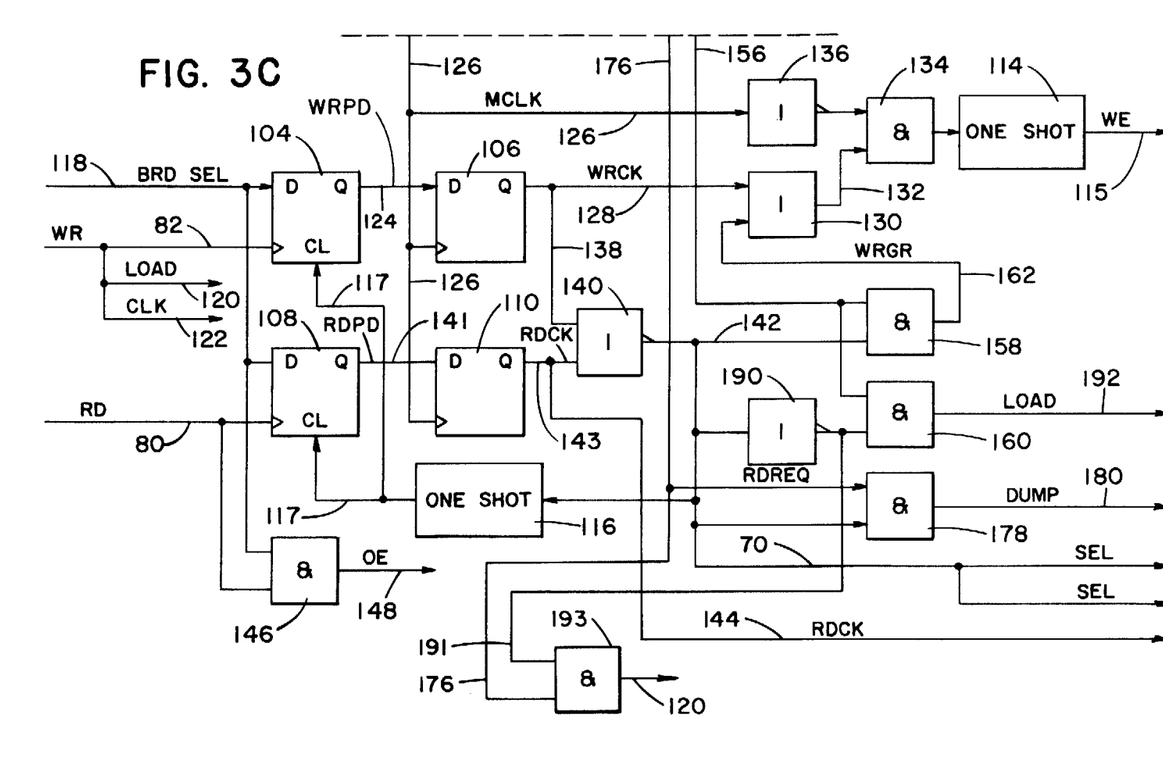

Referring now to FIGS. 3A, 3B and 3C, there is shown a detailed block diagram of the multiprocessor memory access system in which the slow and fast processors are able to access the same stored data in an orderly fashion. As shown in FIG. 3A, the slow processor 20 has coupled to it 16 address lines of which 8 address lines indicated by bus 24A are coupled to a decoder 58 at whose input will appear the most significant address bits AB15–AB8 identifying the slow processor 20 and indicating that the slow processor 20 is accessing the memory unit 26. The decoder 58 may consist of an inverter and a by-pass switch coupled to each address line with the switch coupled to one input of an 8 input AND gate. An example of the decoder 58 that is commercially available is the Texas Instruments 74LS30 8 input NAND gate.

The other eight address lines indicated as bus 24B will have present thereon the least significant address bits AB7–AB0 of the address of the data currently being accessed by the slow processor 20. The address bits AB7–AB0 are transmitted over the bus 24B to a first in first out address memory unit 22 for storage therein, and also over bus 60 to one input of a 2:1 address multiplexer 34 whose other input receives similar address bits from the fast processor 38 (FIGS. 3B) over bus 62. As will be described more fully hereinafter, the multiplexer 34 will select the address bits generated by the appropriate pocessor for transmission over bus 64 to the RAM memory unit 26 for use in accessing the data in the memory unit in a manner that is well-known in the art.

The slow processor 20 (FIG. 3A) will either output or receive 8 data bits DB7–DB0 over bus 66. The bus 66 is coupled through bus 28 to an 8 bit edge-triggered register 68 for controlling the timing of the output of the data bits DB7–DB0 over bus 30 to one input of the 2:1 data multiplexer 32 whose other input is coupled over bus 52 to the common data bus 48 over which appear the data bits DB7–DB0 from the fast processor 38 (FIG. 3B). Depending on the signal appearing on the select line 70 of the multiplexers 32 and 34 respectively, the address and the data bits transmitted from one of the processors 20 or 38 will be transmitted into the RAM memory unit 26 during a write operation in a manner that is well-known in the art.

If a read operation of the memory unit 26 (FIG. 3A) by the slow processor 20 occurs, data stored in the memory unit 26 at an address transmitted over bus 64 will be outputted over bus 36 to an 8 bit latch 74 which is selectively enabled to output the eight data bits DB7–DB0 over buses 28 and 66 to the processor 20. The data bits DB7–DB0 are also transmitted over buses 36 and 76 through a buffer driver 78 to the data bus 48 for transmission to the fast processor 38 (FIG. 3B) in a manner that will be described more fully hereinafter. The slow processor 20 will output the appropriate read control signal RD over line 80 (FIG. 3A) to initiate a read access operation and a write control signal WR over line 82 to initiate a write access operation. Examples of commercially-available circuits that may be used for the elements just disclosed include a Texas Instruments 74LS157 multiplexer, an Intel 2125 1KX1 RAM memory unit, a Texas Instruments 74LS374 8 bit edge triggered register, a Texas Instruments 74LS373 8 bit fall-through latch, a Texas Instruments 74LS244 buffer driver, and a Fairchild 9403 first-in, first-out buffer memory unit.

Referring now to FIG. 3B, there is shown the fast processor 38 which may be a Signetics 8×300 microprocessor to which is coupled an instruction storage unit 84, such as the Signetics 82S115 PROM which functions, upon receiving the appropriate 9 bit instruction address over bus 86 from the processor 38, to output a 16 bit instruction code over bus 88 to the processor 38, resulting in the operation of the fast processor in accordance with the instruction code in a manner that is well-known in the art. Associated with the fast processor 38 is an internal communication bus 90 which is coupled to an I/O interface 92, an 8 bit latched port 94 which functions to latch the address bits AB7–AB0 generated by the processor 38, a second 8 bit latched port 96 for latching the data bits DB7–DB0 being transmitted over bus 46 and a third 8 bit latched port 100 over which various control signals are generated by the processor 38 in a manner that will be described more fully hereinafter. The blocks 84, 92, 94, 96 and 100 are standard functional units associated with the fast processor 38 and form no part of the present invention.

Coupled to the address bus 62 (FIG. 3B) is a second first-in, first-out address storage unit 44 for storing the data addresses generated by the fast processor 38 as a result of a conflict with the slow processor 20 for use by the processor 38 in accessing the memory units 26 (FIG. 3A) and 42 (FIG. 3B). Coupled to the address bus 62 and the data bus 48 is a second Intel 2125 RAM memory unit 42 which is accessed simultaneously with memory unit 26 (FIG. 3A) by the fast processor 38. An output data bus 102 coupled between the RAM memory unit 42 and the data bus 48 allows data to be transmitted over bus 46 to the latched port 96 for subsequent transmission to the processor 38 in a manner that is well-known in the art.

Shown in FIGS. 3B and 3C are the priority logic circuits 54 (FIG. 1) for controlling the operation of the multiprocessor system which include four TI 74LS74 D-type flip-flops 102–110 inclusive and three TI 74LS123 single-shot multivibrators 112–116 inclusive for providing the proper pulse width control signals used in enabling the accessing of the memory units 26 (FIG. 3A) and 42 (FIG. 3B) together with conditioning the operation of certain of the priority logic circuits in a manner that will now be disclosed. For purposes of illustration, there will now be described a write operation by the slow processor 20 (FIG. 3A) which involves only the memory unit 26. When the processor 20 is in a write mode, the most significant bits of the data address bits will appear on the bus 24A for transmission to the decoder 58 enabling the decoder to output an active high board select signal BRDSEL over line 118 to the D input of flip-flop 104 (FIG. 3C). The least significant address bits will appear on bus 24B for storage in the address storage unit 22 upon the generation of an active high write signal WR on the output line 82 of the slow processor 20, which signal is transmitted to the clock input of flip-flop 104 (FIG. 3C). The signal WR becomes the signal LOAD (FIG. 3C) over line 120 which signal loads the address bits BD7–BD0 into the address storage unit 22. The storing of the address bits BD7–BD0 in the storage unit 22 loads the address bits into the last slot on the output end of the storage unit 22 and lowers the signal EMPTY appearing on the output line 188 of the storage unit 22 indicating that the storage unit 22 contains an address representing data stored in the memory unit 26. The use of a first-in, first-out memory unit for the storage units 22 and 44 implements both the storage of the addresses and keeps track of how many addresses are stored therein, which information is needed by the fast processor 38 to keep the memory units 26 and 42 in balance, as will be described more fully hereinafter.

The active high write signal WR appearing on the output line 82 of the slow processor 20 will also become the clock signal CLK (FIG. 3C) over line 122 which signal clocks in the data bits DB7–DB0 into the 8 bit edge-triggered register 68 (FIG. 3A). The signal WR clocks the flip-flop 104 (FIG. 3C) over line 82 on whose D input appears the active high signal BRDSEL as disclosed above. Clocking of the flip-flop 104 will output an active high write pending signal WRPD on the Q output of flip-flop 104 for transmission over line 124 to the D input of the synchronizing flip-flop 106 on whose clock input will appear the memory clock signal MCLK over line 126 from the processor 38 (FIG. 3B). Since the processor 38 is faster than the processor 20, the flip-flop 106 synchronizes the operation of the processor 38 with the operation of the processor 20 by looking at the clock signal MCLK of the processor 38. The signal MCLK is active high when the fast processor 38 is performing any type of access operation such as initiating a write access operation in the memory unit 26 (FIG. 3A) and memory unit 42 (FIG. 3B).

The clocking of the flip-flop 106 (FIG. 3C) by the active high signal MCLK will output the active high signal WRCK on its Q output line 128 to one input of an OR gate 130 which high signal is transmitted from the output of OR gate 130 over line 132 to one input of the AND gate 134. The other input to the AND gate 134 is low due to the clock signal MCLK appearing on line 126 being high at this time, indicating an operation of the fast processor 38. The active high signal MCLK is transmitted over line 126 through an inverter 136 to the other input of AND gate 134. At the completion of each operation of the fast processor 38, the signal MCLK will go low, at which time the AND gate 134 will output an active high control signal to the one-shot 114 which outputs a pulse WE of predetermined width over line 115 to the memory unit 26 (FIG. 3A) enabling a write operation to occur in the memory unit by the slow processor 20.

The Q output of flip-flop 106 (FIG. 3C) is also coupled over line 138 to one input of a NOR gate 140. Upon the write clock signal WRCK going high at the time of a write operation by the slow processor 20, the output of the NOR gate 140 will go low, which signal SEL is transmitted over line 70 to the multiplexers 32 and 34 (FIG. 3A) switching the multiplexers to output the address and data bits generated by the processor 20 over bus 60 and 30, respectively, for transmission to the memory unit 26 to complete the access operation.

If the slow processor 20 initiates a read operation, the active high read signal RD will appear on the output line 80 (FIG. 3A) of the processor 20. This signal is transmitted over line 80 to the clock input of flip-flop 108 (FIG. 3C) setting the flip-flop, thereby allowing the flip-flop 108 to output an active high read pending signal RDPD over line 141 to the D input of the flip-flop 110, resulting in the flip-flop 110 outputting on its Q output the active high read clock signal RDCK upon the setting of the flip-flop 110 by the signal MCLK going high in the manner described previously. The signal RDCK is transmitted over lines 143 and 144 to the latch 74 (FIG. 3A), disabling the latch from latching the data being outputted by the memory unit 26 over bus 36. Upon the flip-flop 110 being reset when the read signal RD goes low at the end of the read operation, the signal RDCK will go low enabling the latch 72 to latch the data transmitted from the memory unit 26.

The active high signal RDCK is also transmitted over line 143 to the NOR gate 140 (FIG. 3C) whose output low select signal SEL is transmitted over line 70 to the multiplexers 32 and 34 (FIG. 3A) switching the multiplexers to input the address and data bits from the slow processor 20 into the memory unit 26, thereby enabling the processor 20 to perform a read operation. As a result of this read operation, the memory unit 26 outputs the required data over bus line 36 to the latch 74 which is enabled by the low RDCK signal transmitted over line 144 in the manner described previously.

The output signal SEL of the NOR gate 140 is also transmitted over line 70 to the one-shot 116 (FIG. 3C) enabling the one-shot to output over line 117 a pulse of sufficient duration for resetting the flip-flops 104 and 108 ending the pending condition of the slow processor 20. The reason for resetting the flip-flops 104 and 108 at this time is to prevent the priority circuits from sensing a double memory access operation by the slow processor 20 due to the length of time required for the processor 20 to complete a memory access operation. After the flip-flops 104 are reset, the flip-flop 110 is clocked to a reset condition by the clock signal MCLK appearing on line 126. This condition allows the clock signal RDCK appearing on line 144 to clock the data into the latch 74 only when the data has become stable. The signal RD appearing on the output line 80 (FIG. 3A) of the processor 20 is also transmitted to an AND gate 146 (FIG. 3C) which is enabled by the board select signal BRDSEL appearing on line 118. The active high output signal OE of AND gate 146 is transmitted over line 148 to the latch 74 (FIG. 3A) enabling the latch 74 to transmit the data to the processor 20 over data buses 28 and 66.

Referring now to FIG. 3B, there is shown the fast processor 38 coupled to various control units used in the operation of the processor 38 in a manner that is well-known in the art. Included in these units is the PROM memory 84 which stores a fixed program for operating the processor 38. The I/O interface 92 functions to couple any I/O device to the processor 38 in a manner that is well-known in the art. The 8 bit latched port 94 latches the address bits generated in the processor 38 that are required by the processor 38 in accessing the memory units 26 and 42. The address bits are transmitted from the port 94 over the address bus 62 (FIGS. 3A and 3B) for inputting into the multiplexers 34, over buses 62 and 150 (FIG. 3B) into the address storage unit 44 and over buses 62 and 40 into the RAM memory unit 42.

The 8 bit latched port 96 (FIG. 3B) controls the flow of data between the fast processor 38 and the system. The latched port 100 outputs the various control signals from the processor 38 for controlling a read or write operation, Thus, in a write operation by the processor 38, an active high write signal WR appearing on line 152 of the port 100 will enable the one-shot 112 to output the write enable signal WE over line 154 to the RAM memory unit 42 (FIG. 3B) enabling a write access operation to occur in the memory unit in which the data will be outputted from processor 38 to memory unit 42 through port 96 and buses 46 and 48. As described previously, the addresses stored in the address storage unit 44 are those used by the fast processor 38 in attempting to write into the memory unit 26 but failed due to a conflict with the slow processor 20. Since the processor 38 accesses the memory 42 without the possibility of conflict with the processor 20, the raising of the signal WR over line 152 enables the access operation of the memory unit 42 to occur. Since both processors are able to access the memory unit 26 (FIG. 3A), the priority circuits will determine which processor has access to the memory unit 26 when there is a conflict in a manner that will now be described.

When the fast processor 38 (FIG. 3B) initiates a write access operation in which the slow processor 20 is not contending, an active high write request signal WRREQ will appear on line 156 (FIG. 3B and 3C) of the 8 bit latched port 100, which signal is transmitted to one input of an AND gate 158 (FIG. 3C) and a second AND gate 160 (FIG. 3C). The other input of the AND gate 158 is coupled to the output of the NOR gate 140. Since the slow processor 20 (FIG. 3A) is not contending at this time with a read or write operation, the inputs to the NOR gate 140 will be low, enabling the gate 140 to output a high signal to the AND gate 158 thereby enabling the gate to output an active high write granted signal WRGR over line 162 to the OR gate 130. The gate 130 transmits the active high signal WRGR to the AND gate 134. Upon the synchronizing clock pulse MCLK going low, the other input signal to the AND gate 134 will go high, enabling the gate 134 to output a high signal to the one-shot 114 whose output write enable signal WE is transmitted over line 115 to the memory unit 26 (FIG. 3A) allowing a write access operation by the processor 38 to occur. Thus, both memory units 26 and 42 are simultaneously accessed by the fast processor 38.

There will now be described a read access operation of the memory unit 26 (Fig. 3A) by the fast processor 38 (FIG. 3B) which occurs when the memory unit 26 contains data not found in memory unit 42. As was disclosed previously, the processor 38 is required to keep the data stored in both memory units 26 and 42 balanced. In fulfilling this requirement, the processor 38 is programmed to check the address storage units 22 and 44 to see if they are storing any addresses therein indicating that their associated memory units contain data not stored in the other memory unit. This condition will occur when the slow processor 20 writes into the memory unit 26 or when the fast processor 38 is interrupted during a write operation of both memory units 26 and 42 by the operation of the processor 20 in a manner to be described hereinafter. When either or both of these conditions exist, the fast processor 38 is required to transfer data between the memory units so that they are in balance. This operation is called a balancing operation.

The fast processor 38 (FIG. 3B) will initiate a balancing operation by raising an active high signal ENBL on the output line 164 of the latched port 100 which signal is transmitted to the buffer driver 166 (FIG. 3B) on whose input lines appear the signal EMPTY received over lines 188 and 174 from the address storage units 22 (FIG. 3A) and 44 (FIG. 3B) respectively. The signal EMPTY indicates whether any addresses are stored in the storage unit indicating an out of balance condition exists. If the EMPTY signal appearing on the corresponding lines of the output bus 167 is low, the output signals of the driver 166 will be low.

Assume for purposes of illustration the EMPTY signal appearing on the output line 174 of the storage unit is low. This signal is transmitted over buses 48 and 46 to the port 96 which transmits the signal to the processor 38. In response to receiving this signal, the processor 38 will initiate a balancing operation by raising the active high signal OE on the line 169 of port 100 (FIG. 3B) which signal is transmitted to the address storage unit 44 resulting in an address being outputted over the buses 170, 48 and 46 to the processor 38. The raising of the signal OE over line 169 puts the address on the bus 170 while the signal DUMP eliminates the signal from the bus 182 at the completion of the balancing operation. The same operation occurs with the signal OE raised over line 181 of port 100 when the address storage unit 22 (FIG. 3A) is involved. The processor 38 using the address received will output an enable signal OE over line 172 of the latched port 100 to the memory unit 42 allowing the processor 38 to read the data from the memory unit 42. The processor 38 will then write the data into the memory unit 26 by raising the write request signal WRREQ on line 156 of port 100 for transmission to the priority circuits in the manner described previously.

If during this balancing operation the slow processor 30 is not in contention for access to the memory unit 26, the write enable signal WE will be raised on the output line 115 (FIG. 3C) of the one-shot 114 enabling the data to be written into the memory unit 26. This operation is repeated until the signal EMPTY on the output line 174 of the storage memory unit 44 is raised indicating that all the addresses contained in the storage unit have been processed.

In order to read the memory unit 26 (FIG. 3A) and an address stored in the address storage unit 22 (FIG. 3A) for transfer to the memory unit 42 (FIG. 3B), the fast processor 38 raises the read request signal RDREQ on the output line 176 (FIG. 3B and 3C) of the latched port 100 for transmission to one input of the AND gate 178 (FIG. 3C). The other input of the AND gate 178 is coupled to the output of the NOR gate 140. If the slow processor 20 is not contending at this time, the output of the NOR gate 140 will be high, enabling the AND gate 178 to output the active high signal OE over line 181 to the address storage register 22 (FIG. 3A) which outputs the address present at its output over buses 182 (FIG. 3A), 48 and 46 (FIG. 3B) to the processor 38. The processor 38 will then output the same address from the latched port 94 over bus 62 (FIG. 3A and 3B), through the multiplexer 34 operated at this time by the low signal SEL appearing on line 70 (FIG. 3A) and over bus 64 to the memory unit 26 which has been enabled by the active high enable pulse WE outputted over line 115 (FIG. 3C) from the one shot 114 in the manner described previously.

After reading out the data from the memory unit 26, the processor 38 will write the data into the memory unit 42 by raising the enable signal ENBL over the output line 184 of the latched port 100. This signal is transmitted to the buffer driver 78 (FIG. 3A) which outputs the data present on the bus 36 to the bus 48. The data appearing on bus 48 is written into the memory unit 42 (FIG. 3B) upon the write enable signal WE appearing on the output line 154 of the one-shot 112 (FIG. 3B) as a result of the raising of the write signal WR on the output line 132 of the port 100. This operation will be repeated for each address appearing on the output of the address storage register 22 (FIG. 3A) until the signal EMPTY appearing on the output line 188 of the storage unit 22 is raised. This signal is transmitted to the buffer driver 166 indicating the condition of the storage unit 22. If at this time both address storage units 22 (FIG. 3A) and 44 (FIG. 3B) are empty indicating that the memory units 26 and 42 are in balance, the balancing operation will be terminated by the fast processor 38.

As described previously, the fast processor 38 will normally write into both memory units 26 and 42 simultaneously to keep them in balance. Since the processor 38 has complete control of the memory unit 42, the only conflict occurs when both processors 20 and 38 are trying to gain access to the memory unit 26 (FIG. 3A) at the same time. If the fast processor 38 is trying to write into the memory units 26 and 42, the signal WRREQ is raised on line 156 of port 100 (FIG. 3B) as explained previously. This signal is transmitted to one input of the AND gate 160 (FIG. 3C) whose other input is coupled to the output of the NOR gate 140 through an inverter 190. If the slow processor 20 is contending at this time, the output signal SEL of the NOR gate 140 will be low in the manner described previously, which signal is inverted by the inverter 190 (FIG. 3C) thereby enabling the AND gate 160 to output the active high signal LOAD over line 192 to the address storage unit 44 (FIG. 3B) storing the address the processor 38 was attempting to write into the memory unit 26 (FIG. 3A). The signal SEL going low will switch the multiplexer 32 and 34 (FIG. 3A) enabling the processor 20 to access the memory unit 26 (FIG. 3A). Switching of the multiplexer 32 and 34 in this manner interrupts the write operation of the memory unit 26 by the processor 38 requiring the processor 38 to balance the memory units 26 and 42 at the conclusion of the operation of the processor 20. If during the balancing operation, the slow processor generates a write operation an AND gate 193 (FIG. 3C) whose inputs are coupled to line 176 and the output of the inverter 190 will output the active high signal LOAD over line 120 to the storage unit 22 (FIG. 3A) allowing the address at which the processor 20 was writing to be stored.

The storing of the address in the address storage unit 44 upon the raising of the signal LOAD in the manner described above will lower the signal EMPTY. Upon the fast processor 38 checking the output bus 167 of the driver 166 (FIG. 3B) and seeing the low output signal of the driver appearing on the line corresponding to the input line 174 of the driver 166, the processor 38 will initiate a balancing operation in which the addresses stored in the address storage unit 44 are used to balance the memory unit 26 in the manner described previously. It will thus be seen that both memory units 26 and 42 are continuously updated and balanced by the fast processor 38, enabling both the slow processor 20 and the fast processor 38 to perform access operations with a minimum of interference and without danger of losing data when conflicts do occur.

While there has been described a form of the invention and its mode of operation, it will be apparent to those skilled in the art that changes may be made in the circuits described without departing from the spirit and scope of the invention as set forth in the appended claims, and that in some cases certain features of the invention may be used to advantage or modified without corresponding changes in other features while certain features may be substituted for or eliminated as appreciated by those skilled in the art.

What is claimed is:

1. A data processing system comprising:
   a first memory unit;
   a second memory unit;
   a first processor having priority of access only to said first memory unit for writing data into said first memory unit;
   a second processor having a higher operational speed than said first processor for writing data simultaneously into said first and second memory unit;
   priority selecting means for disabling said second processor from writing into said first memory unit in response to the occurrence of a write operation by said first processor after the start of a write operation by said second processor;
   a first storage unit coupled to said second processor and operated in response to the occurrence of a write operation by said first processor to store the addresses of the data written into said second memory unit by said second processor, said storage unit outputting a control signal upon the storing of said addresses;
   means coupled to said second processor for storing said control signal and operated by said second processor at the completion of the operation of said first processor to output said control signal to said second processor wherein said second processor is enabled to initiate a write operation in said first memory in response to receiving said control signal;
   and switchng means coupled between said first and second memory units and operated by said priority selecting means enabling said second processor to transfer the data written into the second memory unit by said second processor into said first memory unit and the data written into said first memory unit by said first processor into said second memory unit thereby balancing the data stored in said first and second memory unit.

2. The data processing system of claim 1 in which:
   said priority selecting means includes a first gating means enabled upon the simultaneous occurrence of a write operation by said first and second processors to operate said first storage unit to store the addresses of the data written into said second memory unit.

3. The data processing system of claim 2 in which said switching means includes multiplexing means coupled between said first and second processors and said first and second memory units, said priority selecting means further including second gating means enabled upon the occurrence of a write operation by said first processor to operate said multiplexing means whereby said first processor is coupled to said first memory unit enabling said first processor to write into said first memory unit.

4. A data processing system comprising; a first memory unit; a second memory unit; a first processor generating first data signals, first data address signals and a first write request signal for writing the first data signals only into said first memory unit at said first data address;
   a second processor having a higher operating speed than said first processor, said second processor generating second data signals, second data address signals and a second write request signal for writing simultaneously the second data signals into said first memory unit and a second memory unit at said second data address:
   first storage means coupled to said second processor and operated in response to the generation of said first write signal for storing said second address signals, said storage means generating a first control signal in response to the storing of the address signals;
   logic control means responsive to the generation of said first and second write request signals during the write operation of said second processor for disabling said second processor from writing said second data signals into said first memory unit and enabling said first processor to write said first data signals into said first memory unit;

second storage means coupled to said first storage means and said second processor for storing said first control signal representing the storing of said second address signals in said first storage means, said second storage means enabled by said second processor to output said first control signal to said second processor enabling said second processor to generate a write operation in said first memory unit in response to the completion of the write operation of said first processor;

and means responsive to the generation of said first write request signal during the write operation of said second processor to transfer, in response to said write operation of said second processor occurring at the completion of the write operation of said first processor, the first data signals written into the first memory unit by said first processor to said second memory unit and the second data signals written into the second memory unit by said second processor to said first memory unit to balance the data in said first and second memory units enabling said first and second processors to access the same data.

5. The data processing system of claim 4 which further comprises:

a third storage means for storing the address signals of the first data signals written into said first memory unit by said first processor;

and said logic control means includes first gating means responsive to the generation of said first write request signal during the write operation of said second processor to enable said first storage means to store said second address signals, thereby enabling said transfer means to transfer the second data signal to said first memory at the completion of the operation of said first processor.

6. The data processing system of claim 5 in which said transfer means includes:

a first multiplexing means coupled to said first and second processors and said first memory unit for receiving said first and second data address signals;

a second multiplexing means coupled to said first and second processor and said first memory unit for receiving said first and second data signals;

and said logic control means includes second gating means coupled to said first and second multiplexing means and responsive to the generation of said first write request signal during the write operation of said second processor to enable said first and second multiplexig means to transmit to said first memory unit the first data and address signals generated by said first processor.

7. The data processing system of claim 5 in which said first and second storage means comprise a first-in, first-out memory unit constructed to output said first control signal to said second storing means when enabled.

8. A data processing system comprising:

(a) a first memory unit;
(b) a second memory unit;
(c) a first processor having access to only said first memory unit, said first processor generating first data signals, first data address signals and a first write request signal for writing the first data signals into said first memory unit at said first data address;
(d) a second processor having an operational speed greater than said first processor and having access to said first and second memory units, said second processor generating second data signals, second data address signals and a second write request signal for writing simultaneously the second data signals into said first memory unit and a second memory unit at said second data address;
(e) a first first-in, first-out storage unit coupled to said first processor for storing the address signals of the first data signals written into said first memory unit by said first processor;
(f) a second first-in, first-out storage unit coupled to said second processor for storing, when enabled, the address signals of said second data signals written into said second memory unit by said second processor, said first and second storage units generating a first control signal upon storing said address signals;
(g) a first multiplexing means coupled to said first and second processors and said first memory unit for receiving said first and second data address signals;
(h) a second multiplexing means coupled to said first and second processor and said first memory unit for receiving said first and second data signals;
(i) first gating means coupled to said first and second multiplexing means and responsive to the generation of said first write request signal for outputting a second control signal to said first and second multiplexers to enable said first and second multiplexer means to transmit to said first memory unit the first data and address signals generated by said first processor;
(j) second gating means coupled to said first gating means and said second processor and responsive to the generation of said second control signal and said second write request signal to store said second address signals in said second storage unit;
(k) and storage means coupled to said second processor means and said first and second storage units for storing said first control signal and enabled by said second processor in response to the completion of a write operation by said first processor for transmitting said first control signal to said second processor enabling said second processor to transfer the first data signals written into the first memory unit by said first processor to said second memory unit and the second data signals written into the second memory unit by said second processor to said first memory unit to balance the data in said first and second memory units enabling said first and second processors to access the same data.

* * * * *